United States Patent
Wang et al.

(10) Patent No.: US 7,699,972 B2
(45) Date of Patent: Apr. 20, 2010

(54) METHOD AND APPARATUS FOR EVALUATING POLISHING PAD CONDITIONING

(75) Inventors: Zhihong Wang, Santa Clara, CA (US); Yongqi Hu, San Jose, CA (US); Stan D. Tsai, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1078 days.

(21) Appl. No.: 11/370,474

(22) Filed: Mar. 8, 2006

(65) Prior Publication Data

US 2007/0209946 A1 Sep. 13, 2007

(51) Int. Cl.
*C25F 3/02* (2006.01)
*B23H 5/06* (2006.01)

(52) U.S. Cl. .................... 205/645; 205/662
(58) Field of Classification Search .............. None
See application file for complete search history.

(56) References Cited

U.S. PATENT DOCUMENTS

| | | | | |
|---|---|---|---|---|
| 5,589,303 A * | 12/1996 | DeMarco et al. | | 430/5 |
| 6,113,462 A * | 9/2000 | Yang | | 451/5 |
| 6,910,947 B2 * | 6/2005 | Paik | | 451/21 |
| 6,914,000 B2 * | 7/2005 | Kamada | | 438/692 |
| 7,040,956 B2 * | 5/2006 | Paik | | 451/5 |
| 2004/0053560 A1 * | 3/2004 | Sun et al. | | 451/36 |
| 2006/0046623 A1 * | 3/2006 | Wang et al. | | 451/56 |

\* cited by examiner

*Primary Examiner*—Harry D Wilkins, III
(74) *Attorney, Agent, or Firm*—Patterson & Sheridan

(57) ABSTRACT

A method and apparatus for evaluating a conditioned electrochemical mechanical polishing pad are provided. A polishing pad is conditioned using a first set of process conditions. A sheet wafer and a residue wafer are polished on the polishing pad. The removal rates of one or more materials from the sheet wafer and the residue wafer are measured. A normalized removal rate is calculated. The polishing pad is further conditioned if the normalized removal rate is not within a minimum value and a maximum value. In one embodiment, the normalized removal rate comprises a ratio of the removal rate of the residue wafer to the removal rate of the sheet wafer.

18 Claims, 6 Drawing Sheets

METHOD AND APPARATUS FOR EVALUATING POLISHING PAD CONDITIONING

BACKGROUND OF THE INVENTION

1. Field of the Invention

Embodiments of the present invention generally relate to a method and apparatus for conditioning a polishing pad.

2. Description of the Related Art

Electrochemical Mechanical Processing (ECMP) is a technique used to remove conductive materials from a substrate surface by electrochemical dissolution while concurrently polishing the substrate with reduced mechanical abrasion as compared to conventional Chemical Mechanical Polishing (CMP) processes. ECMP systems may generally be adapted for deposition of conductive material on the substrate by reversing the polarity of the bias applied between the substrate and an electrode. Electrochemical dissolution is performed by applying a bias between a cathode and a substrate surface to remove conductive materials from the substrate surface into a surrounding electrolyte. The bias may be applied to the substrate surface by a conductive contact disposed on or through a polishing material upon which the substrate is processed. The polishing material may be, for example, a processing pad disposed on a platen. The processing pad is an important aspect of the ECMP process. The processing pad must have the appropriate mechanical properties for substrate planarization while minimizing the generation of defects in the substrate during polishing. A mechanical component of the polishing process is performed by providing relative motion between the substrate and the polishing material that enhances the removal of the conductive material from the substrate.

ECMP normally comprises removal of bulk conductive material with a high removal rate, removal of a residual conductive material with a moderate removal rate, followed by removal of a barrier layer. Efficient removal of the conductive material depends upon uniform biasing of the conductive material. As a result, uniform local electrical contact between the polishing material and the substrate surface is highly desirable. For this reason, pad conditioning procedures (break-in procedures) and apparatus have been developed to condition pads so they can provide superior local electrical contact.

Therefore, there is a need for a method and apparatus for evaluating the ability of a conditioned polishing material to provide uniform local electrical contact to a substrate surface.

SUMMARY OF THE INVENTION

The present invention generally relates to a method and apparatus for conditioning a polishing pad. Some aspects of the invention are generally directed to evaluating a conditioned electrochemical mechanical polishing pad. Other aspects are directed to developing a pad conditioning procedure for optimization of the pad conditioning for polishing pads used to remove the material from a wafer. Other aspects are directed to a method of forming a test wafer.

Embodiments of a method and apparatus for evaluating a conditioned electrochemical mechanical polishing pad are provided. A polishing pad is conditioned using a first set of process conditions. A sheet wafer and a residue wafer are polished on the polishing pad. The removal rates of one or more materials from the sheet wafer and the residue wafer are measured. A normalized removal rate is calculated. The polishing pad is further conditioned if the normalized removal rate is not within a minimum value and a maximum value. In one embodiment, the normalized removal rate comprises a ratio of the removal rate of the residue wafer to the removal rate of the sheet wafer.

In another embodiment a method of developing a pad conditioning procedure for optimization of the pad conditioning for polishing pads used to remove one or more materials from a wafer is provided. A polishing pad is conditioned using at least one pad conditioning parameter. A normalized removal rate is calculated. A relationship between the at least one pad conditioning parameter and the normalized removal rate is determined. The at least one pad conditioning parameter is updated to maintain the normalized removal rate within a minimum and a maximum value. In one embodiment, calculating the normalized removal rate comprises polishing a sheet wafer and a residue wafer using a first set of pad conditioning parameters, measuring material removal rates of the sheet wafer and the residue wafer, and calculating a ratio of the removal rate of the residue wafer to the removal rate of the sheet wafer.

In another embodiment a method of developing a test wafer is provided. A residual layer is deposited on a substrate of the test wafer, wherein the test wafer includes a barrier layer. Selected areas of the residual layer are covered. The uncovered areas of the residual layer are etched to expose a portion of the barrier layer in the uncovered areas.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a graph showing the normalized removal rate for specific points on the wafer for wafers polished with a new fully conductive pad versus wafers polished withy a fully conductive pad after appropriate conditioning/break-in.

DETAILED DESCRIPTION

A method and apparatus for evaluating pad conditioning/break-in of a polishing pad in an electrochemical mechanical polishing process is provided. The method may be utilized in systems where substrate polishing with a polishing pad is desired. Although the embodiments below focus on evaluating the conditioning or pre-conditioning of a polishing pad used in an electrochemical mechanical polishing process, it is contemplated that the teachings within may also be used with other types of pads and other polishing processes, such as Chemical Mechanical Polishing (CMP) processes.

The words and phrases used in the present invention should be given their ordinary and customary meaning in the art by one skilled in the art unless otherwise further defined.

Apparatus

Figure 1:
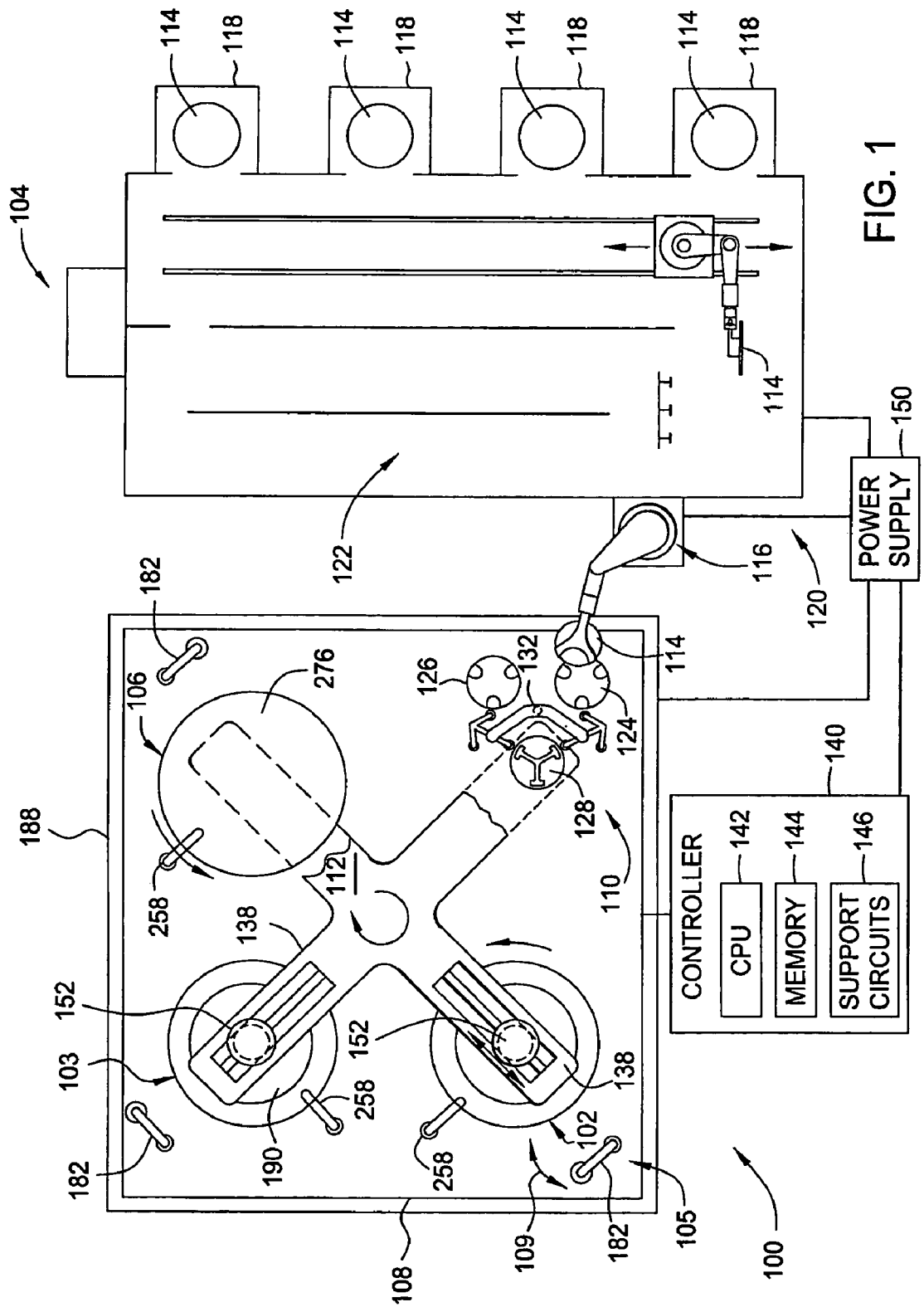
FIG. 1 is a plan view of one embodiment of a processing system.

FIG. 1 is a plan view of a processing system 100 having a processing module 105 that is suitable for electrochemical mechanical polishing and chemical mechanical polishing. The processing module 105 includes at least a first processing station 102, a second processing station 103, and a third processing station 106 disposed in an environmentally controlled enclosure 188. Any of the processing stations 102, 103, and 106 may perform a planarizing or polishing process to remove material from a feature side of a substrate to form a planar surface on the feature side. An example of processing systems that may be used are the REFLEXION and REFLEXION LK ECMP™ system available from Applied Materials, Inc. located in Santa Clara, Calif. Other planarizing modules commonly used in the art may also be adapted to practice the invention.

For example, the first processing station 102 performs an electrochemical mechanical planarization (ECMP) process, the second processing station 103 performs a second ECMP process, and the third processing station 106 performs a conventional chemical mechanical polishing (CMP) process. It is to be understood that the invention is not limited to this configuration and that all of the processing stations 102, 103, and 106 may be adapted to use a CMP process to remove various layers deposited on the substrate. Alternatively, the processing module 105 may include two stations that are adapted to perform a CMP process while another station may perform an ECMP process. In one exemplary process, a substrate having feature definitions formed therein and filled with a barrier layer and then a conductive material disposed over the barrier layer may have the conductive material removed in two steps in the first and second processing stations 102, 103, by an ECMP process, with the barrier layer processed in the third processing station 106 by a conventional CMP process to form a planarized surface on the substrate. It is to be noted that the processing stations 102, 103, and 106 may also be adapted to deposit a material on a substrate by an electrochemical and/or an electrochemical mechanical plating process.

The exemplary processing system 100 generally includes a base 108 that supports the processing stations 102, 103, and 106, a transfer station 110, and a carousel 112. A plurality of conditioning devices 182 are shown coupled to the base 108 and are movable in the direction indicated by arrow 109 in order to selectively place the conditioning device 182 over each of the processing stations 102, 103, and 106. The transfer station 110 generally facilitates transfer of substrates 114 to and from the processing system 100 via a loading robot 116. The loading robot 116 typically transfers substrates 114 between the transfer station 110 and an interface 120 that may include a cleaning module 122, a metrology device 104 and one or more substrate storage cassettes 118.

The transfer station 110 comprises at least an input buffer station 124, an output buffer station 126, a transfer robot 132, and a load cup assembly 128. The loading robot 116 places the substrate 114 onto the input buffer station 124. The transfer robot 132 typically has two gripper assemblies, each having pneumatic gripper fingers that hold the substrate 114 by the substrate's edge. The transfer robot 132 lifts the substrate 114 from the input buffer station 124 and rotates the gripper and substrate 114 to position the substrate 114 over the load cup assembly 128, then places the substrate 114 down onto the load cup assembly 128. An example of a transfer station that may be used is described in U.S. Pat. No. 6,156,124, issued Dec. 5, 2000, entitled "Wafer Transfer Station for a Chemical Mechanical Polisher," incorporated herein by reference in its entirety to the extent the application is not inconsistent with this application.

The carousel 112 generally supports a plurality of carrier heads 190, each of which retains one substrate 114 during processing. The carousel 112 articulates the carrier heads 190 between the transfer station 110 and processing stations 102, 103, and 106. One carousel that may be used is generally described in U.S. Pat. No. 5,804,507, issued Sep. 8, 1998, entitled "Radially Oscillating Carousel Processing System for Chemical Mechanical Polishing," which is hereby incorporated by reference in its entirety to the extent not inconsistent with this application.

The carousel 112 is centrally disposed on the base 108 and typically includes a plurality of arms 138. Each arm 138 generally supports one of the carrier heads 152. Two of the arms 138 depicted in FIG. 1 are shown in phantom so that the transfer station 110 and a processing surface 276 of the processing station third may be seen. The carousel 112 is indexable such that the carrier head 152 may be moved between processing stations 102, 103, and 106 and the transfer station 110 in a sequence defined by the user.

Generally the carrier head 152 retains the substrate 114 while the substrate 114 is disposed in the processing stations 102, 103, and 106, which allows the substrate 114 to be sequentially processed by moving the substrate between stations while being retained in the same carrier head 152.

To facilitate control of the processing system 100 and processes performed thereon, a controller 140 comprising a central processing unit (CPU) 142, memory 144 and support circuits 146 is connected to the processing system 100. The CPU 142 may be one of any form of computer processor that can be used in an industrial setting for controlling various drives and pressures. The memory 144 is connected to the CPU 142. The memory 144, or computer-readable medium, may be one or more of readily available memory such as random access memory (RAM), read only memory (ROM), floppy disk, hard disk, or any other form of digital storage, local or remote. The support circuits 146 are connected to the CPU 142 for supporting the processor in a conventional manner. These circuits include cache, power supplies, clock circuits, input/output circuitry, subsystems, and the like.

Power to operate the processing system 100 and/or the controller 140 is provided by a power supply 150. Illustratively, the power supply 150 is shown connected to multiple components of the processing system 100, including the transfer station 110, the interface 120, the loading robot 116 and the controller 140.

Figure 2:
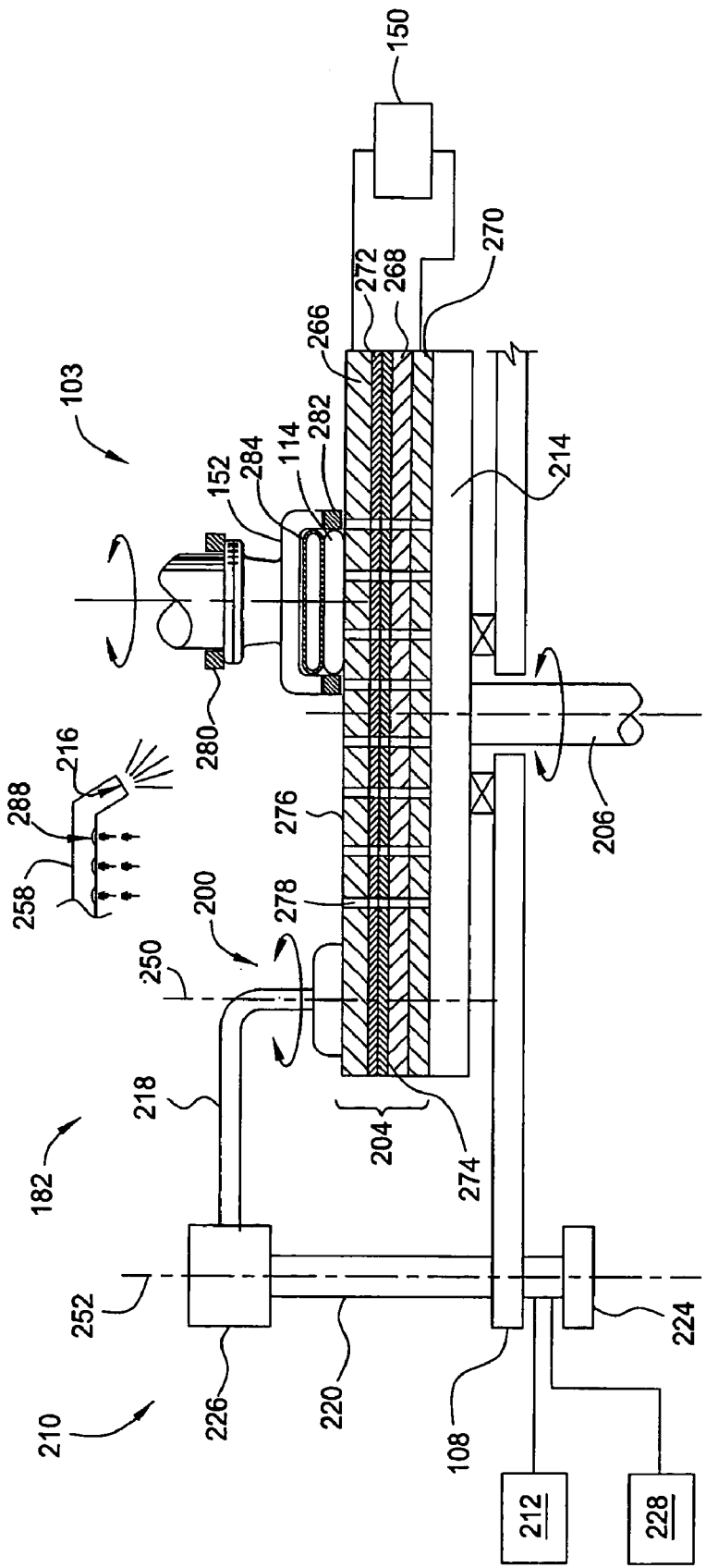
FIG. 2 is a simplified side view of an ECMP polishing station of the present invention.

FIG. 2 is a simplified side view of a processing station 103 of an ECMP system. An example of ECMP stations that may be adapted to benefit from aspects of the invention are described U.S. patent application Ser. No. 10/880,752, filed Jun. 30, 2004 by Wang et al., and U.S. patent application Ser. No. 10/941,060 filed Sep. 14, 2004 by Liu et al., both of which are incorporated herein by reference in their entireties to the extent the applications are not inconsistent with this application. It is also contemplated that the invention may be practiced on conventional (e.g., non-electrically assisted removal or deposition process) chemical mechanical polishers, such as described in U.S. Pat. No. 5,738,574 issued Apr. 14, 2001, entitled "Continuous Processing System For Chemical Mechanical Polishing," to Tolles et al., and in U.S. Pat. No. 6,244,935 issued Jun. 12, 2001, entitled "Apparatus And Methods For Chemical Mechanical Polishing With An Advanceavle Polishing Sheet," to Birang et al., both of which are incorporated herein by reference in their entireties to the extent the applications are not inconsistent with this application.

The processing station 103 generally includes a platen 214 supported by a shaft 206 disposed on or through the base 108. The platen 214 may be selectively rotated in either direction by a motor (not shown). A polishing pad 204 is disposed on the upper surface of the platen 214. Examples of polishing and other processing pads suitable for use in an ECMP system are described in U.S. patent application Ser. No. 10/455,895, filed Jun. 30, 2003, entitled "Conductive Polishing Article For Electrochemical Mechanical Polishing," and U.S. patent application Ser. No. 10/642,128, entitled "Conductive Polishing Article For Electrochemical Mechanical Polishing," filed Aug. 15, 2003, each of which are hereby incorporated by reference in their entireties to the extent the applications are not inconsistent with this application.

In one embodiment, the polishing pad 204 may include a conductive layer 266. One or more electrodes 270 may be coupled to the conductive layer 266 such that the polishing pad 204 forms a unitary replaceable pad stack. The conductive layer 266 has an exposed processing surface 276 on which the substrate 114 is processed. The electrode 270 is disposed on the platen 214 and is coupled to a first terminal of the power supply 150. If the electrode 270 is fabricated from a plurality of independently biasable elements, such as concentric metal rings, each ring may be coupled to a separate terminal of the power supply 150. A second terminal of the power supply 150 is coupled to the conductive layer 266.

The conductive layer 266 may be fabricated from a conductive material, a conductive composite, or one or more exposed conductive elements as part of the processing surface 276. For example, conductive material may be dispersed integrally with or comprise the material comprising the processing surface 276, such as a polymer matrix having conductive particles dispersed therein and/or a conductive coated fabric, among others. The conductive particles may be tin, nickel and/or carbon, among others. It is contemplated that the conductive layer 266 may include one or more non-conductive regions comprising a portion of the processing surface 276, such as regions of polyurethane. The processing surface 276 may be textured, for examples, by a plurality of embossments, grooves and/or other surface features.

The polishing pad may include one or more intervening layers. For example, a conductive foil 272 may be disposed below the conductive layer 266 to promote uniform power distribution across the conductive layer 266. An interposed pad 274 may be provided below the conductive foil 272 to increase mechanical attributes of the conductive layer 266. A subpad 268 may be provided to tailor the compliance of the polishing pad 204. It is contemplated that other pad assemblies will also benefit from the invention. A plurality of holes 278 are provided in the polishing pad 204 to expose the electrode 270 to the processing surface 276.

A carrier head 152 is disposed above the platen 214 and is adapted to hold a substrate against the polishing pad 204 during processing. The carrier head 152 may impart a portion of the relative motion provided between the substrate and the polishing pad 204 during processing. The carrier head 152 may be selectively rotated in either direction. In one embodiment, the carrier head 152 may be a TITAN HEAD™ or TITAN PROFILER™ wafer carrier available from Applied Materials, Inc., of Santa Clara, Calif.

In one embodiment, the carrier head 152 includes one or more bladders 284 which may be deflated to retain the substrate 114 to the carrier head 152. The pressure within the bladder 284 may be controlled during processing to decouple the downforce against the processing surface 276 of the substrate 114 from that of the carrier head 152.

A weight 280 may be clamped or otherwise coupled to the carrier head 152. The additional mass provided by the weight 280 has been found to reduce vibration during processing and contribute to repeatable processing results. In one embodiment, the weight 280, coupled to a carrier head 152 suitable for processing 300 mm substrates, is at least about 20 pounds, and in another embodiment, is at least about 25 pounds. It has been found in one mode of operation; the extra downforce provided by the weight 280 causes the retaining ring 282 to be urged against the processing surface 276 with enough force to prevent substrate slipout during processing without additional downward actuation of the retaining ring 282. This is contrary to conventional carrier head operation as additional force of the retaining ring 282 to be urged against the processing surface 276 to prevent slipout during processing. Since the substrate downforce while processing is provided by the bladder 284, the force of substrate 114 against the polishing pad 204 is decoupled from the force of the retaining ring 282 against the polishing pad 204, whereby providing greater flexibility for process control.

A processing fluid, such as an abrasive slurry and/or an electrolyte, may be provided to the surface of the polishing pad 204 by, for example, a nozzle 216 disposed on a fluid delivery arm 258 and coupled to a processing fluid source (not shown). Alternatively, the polishing fluid may be provided through the platen 214 and polishing pad 204. The fluid delivery arm 258 may include a wiper or brush (not shown) extending therefrom towards the polishing pad 204 to remove or control the amount of foam, fluid and/or other processing and/or conditioning debris that may be present on top of the polishing pad 204.

The conditioning head 200 is supported by a support assembly 210 coupled to the base 108. Support assembly 210 is adapted to position the conditioning head 200 in contact with the polishing pad 204 and further is adapted to provide a relative motion therebetween. The conditioning head 200 generally rotates and/or moves laterally across the surface of the polishing pad 204. In one embodiment, the lateral motion of the conditioning head 200 may be linear or along an arc in a range of about the center of the polishing pad 204 to about the outer edge of the polishing pad 204, such that, in combination with the rotation of the polishing pad 204, the entire surface of the polishing pad 204 may be conditioned. The conditioning head 200 may have a further range of motion to move the conditioning head 200 beyond the edge of the polishing pad 204, e.g., when not in use. One example of a support assembly that may be modified to use with the conditioning head 200 is described in U.S. Pat. No. 6,702,651, issued Mar. 9, 2004, entitled "Method and Apparatus for Conditioning a Polishing Pad," to Tolles et al., which is hereby incorporated by reference to the extent not inconsistent with this application.

In one embodiment, the support assembly 210 includes a stanchion 220 coupled to the base 108 and a support arm 218 coupled to the stanchion 220. The support arm 218 cantilevers the conditioning head 200 over the polishing pad 204. A motor 226 may be utilized to selectively rotate the conditioning head 200 in either direction about an axis 250. An actuator 224 may selectively raise and lower the conditioning head 200 relative to the polishing pad 204. Another actuator (not shown) may be used to rotate the support arm 218, and hence, the conditioning head 200, relative to an axis 252. The actuator 224 may be used to move the conditioning head 200 to the side of the polishing pad 204 when not in use and also may hold in one position or oscillate the conditioning head 200 on the polishing pad 204 during pad cleaning operations.

In the embodiment depicted in FIG. 2, a cleaning fluid source 212 is coupled to the conditioning head 200 through the support assembly 210 to provide a cleaning fluid to the conditioning head 200. A vacuum supply 228 is also coupled to the conditioning head 200 through the support assembly 210 to remove cleaning waste from the conditioning head 200.

Method for Evaluating Polishing Pad Conditioning

Figure 3:
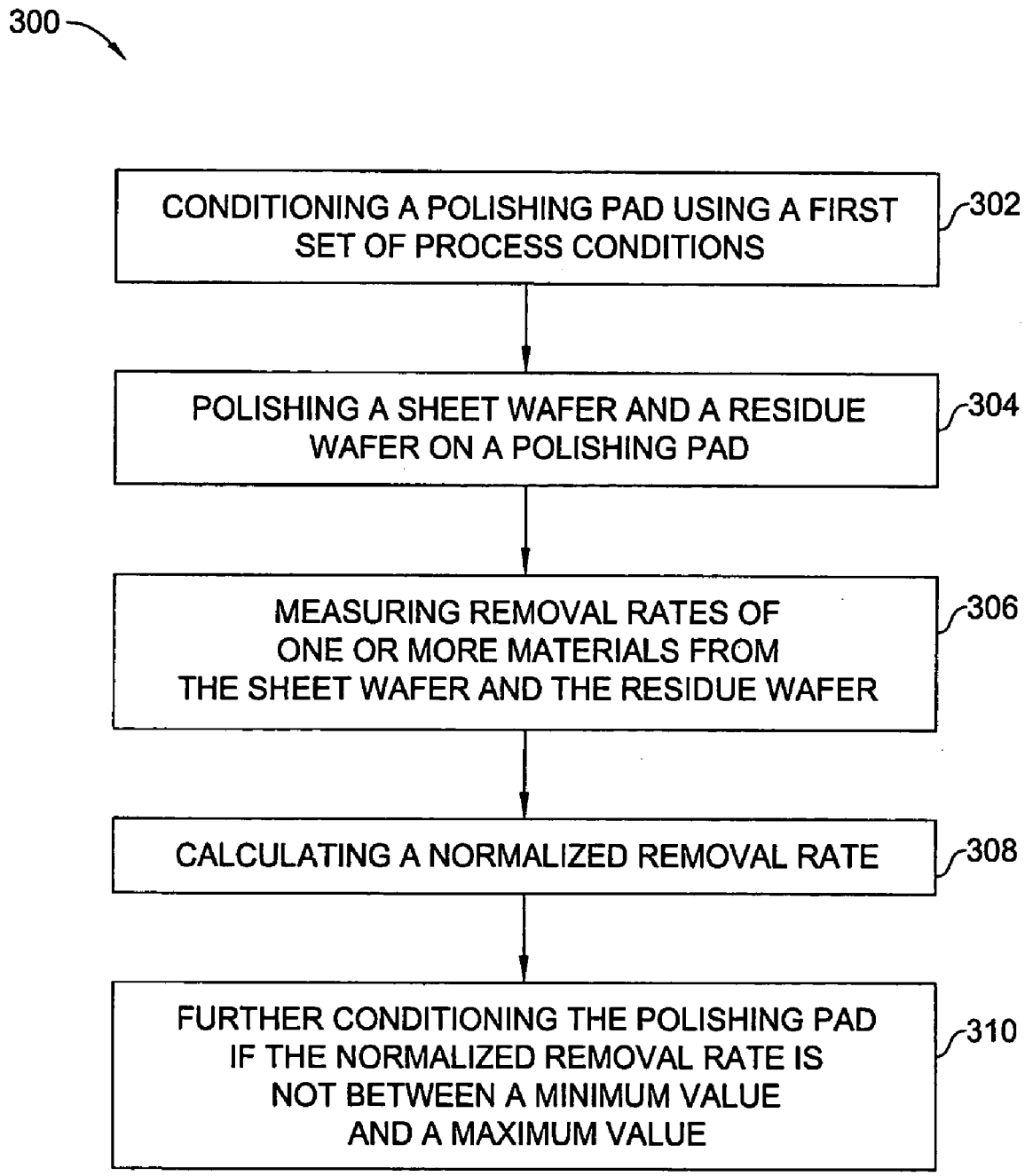
FIG. 3 is a flow diagram of one embodiment of a method for conditioning an ECMP polishing pad.

FIG. 3 depicts one embodiment of a method 300 for evaluating conditioning/break-in of a pad that may be practiced on the processing system 100 described above. The method 300 may also be practiced on other electroprocessing systems that are configured to run the methods described below. The method 300 is generally stored in the memory 144 of the controller 140, typically as a software routine. The software routine may also be stored and/or executed by a second CPU (not shown) that is remotely located from the hardware being controlled by the CPU 142.

Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware.

The method 300 includes conditioning a polishing pad using a first set of process conditions, polishing a sheet wafer and a residue wafer on a polishing pad, measuring the removal rates of material from the sheet wafer and the residue wafer, calculating a normalized removal rate, and further conditioning the polishing pad if the normalized removal rate is less than a minimum value.

The method 300 begins at step 302 by conditioning a polishing pad using a first set of process conditions. In one mode of operation for polishing stations configured to remove either bulk conductive material or residual conductive material from the substrate 114, the polishing pad 204 may be broken-in by contacting the processing surface 276 with the conditioning head 200 with a force between about 0.01 to about 12 pounds. The processing surface 276 (and the platen 214) is rotated in a first direction at a rate of between about 10 to about 120 revolutions per minute (rpm). Hereinafter, a designation of a first direction of rotation is intended to be in the same direction for the platen 214, the carrier head 152 and the conditioning head 200. The conditioning head 200 is rotated in the first direction at a rate of between about 10 to about 120 rpm. The conditioning head 200 may rotate in either the same or the opposite direction as the platen 214. The lateral movement, or sweep, of the conditioning head 200 is in the range of about 0 to about 14 inches from pad center and has a frequency of motion of about 5 to about 40 cycles/minute. Optionally, high pressure deionized water may be sprayed on the processing surface 276 from a nozzle 288 disposed on a fluid delivery arm 258 or other suitable location. It is contemplated that other speeds, downforces, ranges of motion, etc. may be utilized to optimize cleaning or conditioning performance of various polishing or processing pads in various processing systems.

In another embodiment, the conditioning head 200 contacts the processing surface 276 with a force of about 2 pounds, while the conditioning head 200 and processing surface 276 are respectively rotated in the first direction at about 37 and 33 rpm. The sweep of the conditioning head 200 is in the range of about 1.45 to about 11.9 inches from pad center and has a frequency of motion of about 12.8 cycles/minute. High pressure deionized water is applied to the polishing pad 204 during the break-in. The break-in time is between about 10 to about 30 minutes for a pad having a conductive polymer surface suitable for processing a 300 mm substrate.

Optionally, the processing surface 276 of the polishing pad 204 may be conditioned in-situ processing. In one embodiment, in-situ conditioning is performed by contacting the processing surface 276 with the conditioning head 200 with a force between about 0.01 to about 12 pounds while conditioning head 200 is rotated in the second direction at a rate of between about 10 to about 120 rpm. The sweep of the conditioning head 200 is in the range of about 0 to about 14 inches from pad center and has a frequency of motion of about 5 to about 40 cycles/minute.

In another embodiment, the conditioning head 200 contacts the processing surface 276 with a force of about 2 pounds, while the conditioning head 200 is rotated in the second direction at a rate of about 37 rpm. The sweep of the conditioning head 200 is in the range of about 3.6 to about 11.9 inches from pad center and has a frequency of motion of about 19 cycles/minute.

Optionally, ex-situ conditioning may be performed after a predefined number of substrates are processed. In one embodiment, ex-situ conditioning is performed after processing each substrate.

In one mode of operation, the polishing pad 204 may be conditioned ex-situ by contacting the processing surface 276 with the conditioning head 200 with a force between about 0.01 to about 12 pounds (lbs). The processing surface 276 (and the platen 214) is rotated in a first direction at a rate of between about 10 to about 120 rpm. The conditioning head 200 is rotated in the first direction at a rate of between about 10 to about 120 rpm. The lateral movement, or sweep, of the conditioning head 200 is in the range of about 0 to about 14 inches from pad center and has a frequency of motion of about 5 to about 40 cycles/minute. Optionally, high pressure deionized water may be sprayed on the processing surface 276 from a nozzle 288 disposed on a fluid delivery arm 258 or other suitable location. In another embodiment, the sweep of the carrier head 152 is in the range of about 3.6 to about 11.5 inches.

At step 304, a sheet wafer and a residue wafer are polished. After pad break-in, the substrate 114 is processed on the polishing pad 204, for example, to remove residual conductive material from the substrate 114. In one embodiment, the substrate 114 is processed by contacting the processing surface 276 with a force of less than about 2 pounds while a processing fluid from a polishing source is disposed on the processing surface 276 of the polishing pad 204 via nozzle 216 disposed on the fluid delivery arm 258. The carrier head 152 and processing surface 276 are rotated in a second direction. The carrier head 152 is rotated at about 10 to about 60 rpm. The processing surface 276 is rotated at about a rate of between about 5 to about 60 rpm, or in another embodiment, between about 7 to about 35 rpm. The sweep of the carrier head 152 is in the range of about 5.5 to about 6.0 inches from pad center and has a frequency of motion of about 19 cycles/minute. During processing, no additional pressure is required to urge the retaining ring 282 against the polishing pad 204 other than the weight of the carrier head 152. The residual removal process utilizes an electrical bias applied by the power source 150 in a constant voltage mode, generally in the range of about 2 to about 6 volts.

In another embodiment, the substrate 114 is processed by contacting the substrate 114 against the processing surface 276 with a force of less than about 2 pounds, while the carrier head 152 and processing surface 276 are respectively rotated in the second direction at about 21 and 20 rpm. A bias is maintained at about 2.1 V. The sweep of the carrier head 152 is in the range of about 5.5 to about 6.0 inches from pad center and has a frequency of motion of about 19 cycles/minute. No additional force other then the weight of the carrier head 152 is utilized to hold the retaining ring 282 against the polishing pad 204.

At step 306, the removal rate of conductive material from the sheet wafer and the residue wafer is measured. One approach to measurement is to remove the wafer from the polishing apparatus and measure the thickness of the remaining film on the wafer by measuring the wafer thickness before and after polishing. Another approach to measurement involves monitoring the reflectivity of the polished surface or the wavelength of light reflected from the surface. Yet another approach involves monitoring various process parameters which indicate an endpoint when one or more of the process parameters abruptly changes. One method of endpoint detection is disclosed in U.S. patent application Ser. No. 10/949,160, filed Sep. 24, 2004, entitled "Endpoint Compensation in Electroprocessing," to Wang, et al. which is hereby incorporated by reference to the extent not inconsistent with this application. Yet another approach to measurement involves measuring the thickness of the conductive material by 4-point-probe Rs (sheet resistance) measurement. One exemplary measurement tool is KLA-Tencor's Rs-100 resistivity measurement system. The removal rate is then calculated based on the pre and post film thickness. Other methods of endpoint detection are also contemplated.

At step 308 a normalized removal rate is determined. The normalized removal rate is the ratio of residue wafer removal rate to sheet wafer removal rate. The normalized removal rate is an indicator of how good the local electrical contact is. The normalized removal rate is between 0 and 1. The higher the ratio, the better the local electrical contact. For a new pad without any conditioning/break-in on the pad, the normalized removal rate is generally about 0.2. At this stage, the pad provides poor local electrical contact, therefore, residue will be very difficult to remove. After appropriate conditioning/break-in of the pad, the normalized removal rate increases to about 0.8. The pad at this stage provides good local electrical contact and is ready for use in the ECMP process.

Finally, if the normalized removal rate is less than about 0.6 further conditioning of the polishing pad can be performed at step 310. An example of a method for pad conditioning and electroprocessing that may be adapted to benefit from aspects of the invention are described in U.S. patent Ser. No. 11/209,167, entitled "Method For Pad Conditioning And Electroprocessing," filed Jun. 30, 2004 by Wang et al. which is incorporated herein by reference in their entireties.

Figure 4:
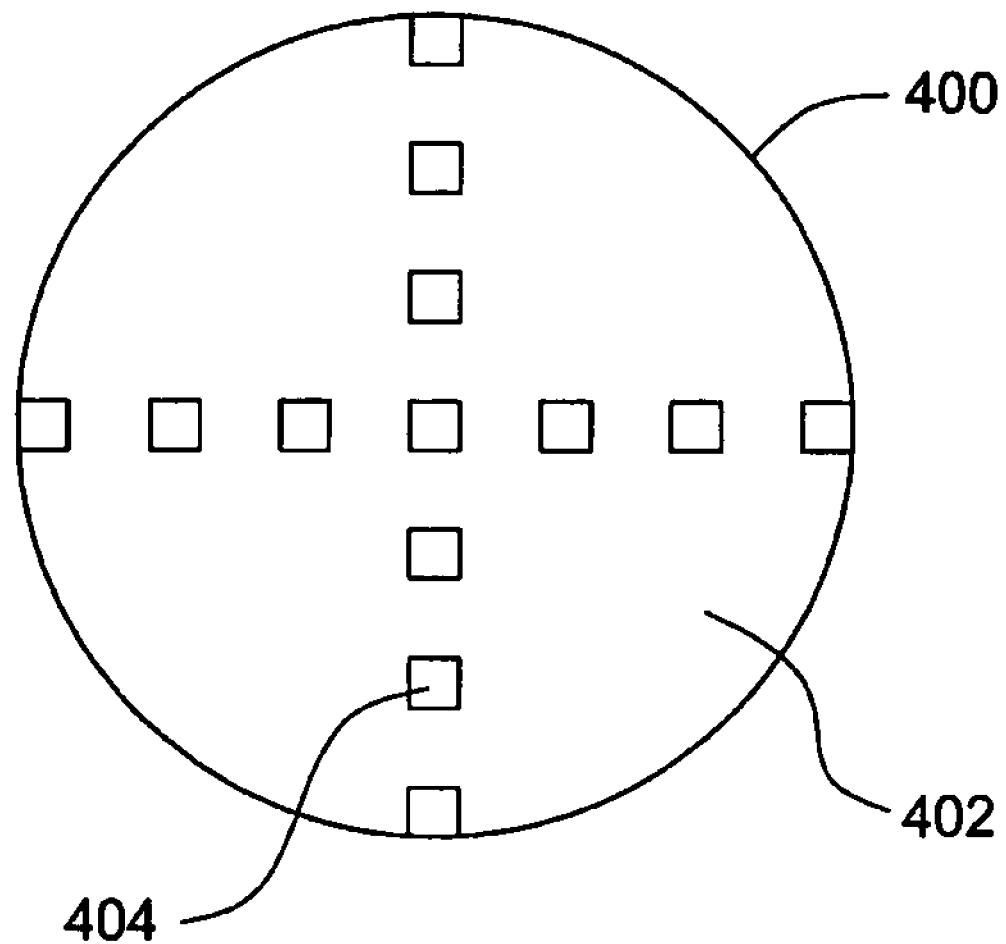
FIG. 4 is a schematic of a residue wafer.

FIG. 4 is a schematic of a residue wafer 400. The residue wafer 400 is formed by covering specific areas on the wafer surface where residue is desired, for example, covering the specific areas with tape. The residue wafer 400 is chemically etched to remove the residual conductive material in the uncovered areas thus exposing the barrier layer 402 while leaving residue 404 on the covered areas. The sheet wafer is a typical blanket wafer known in the art.

Figure 5:
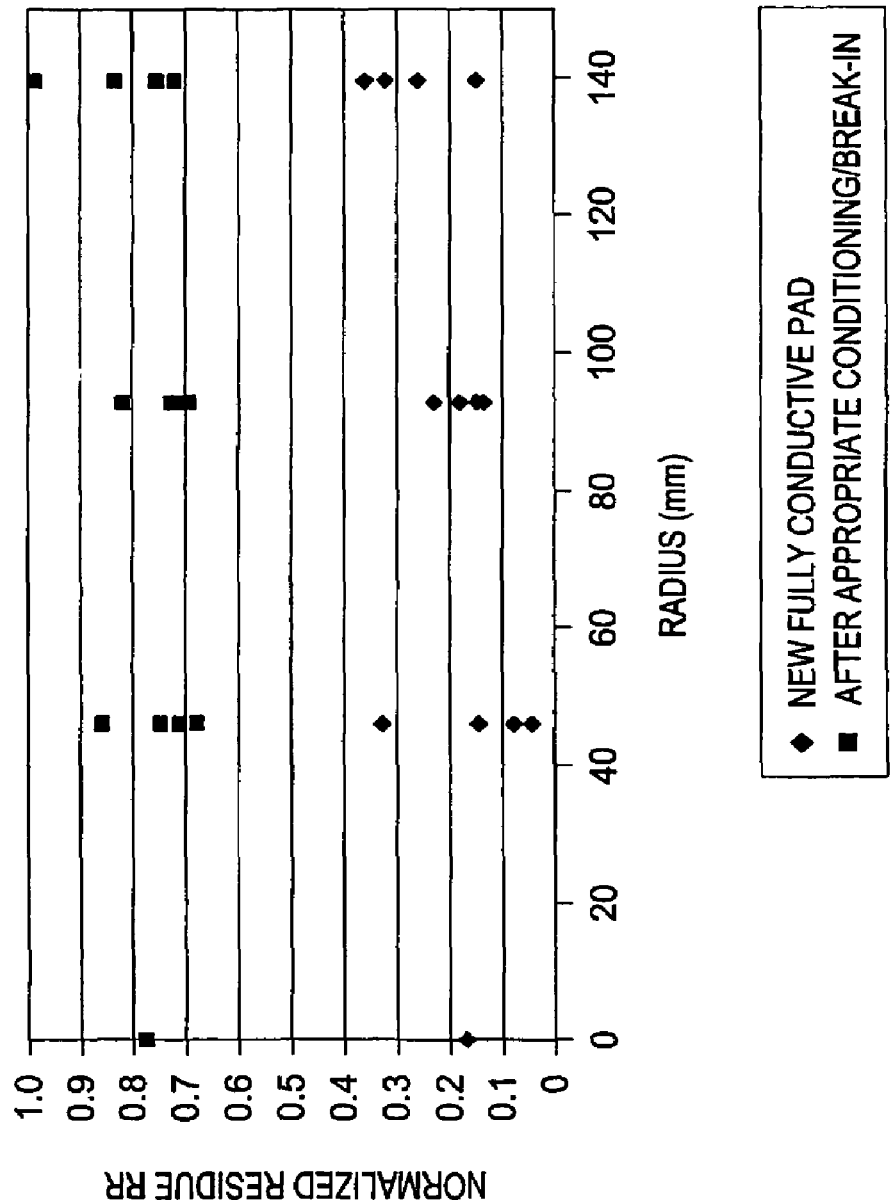

FIG. 5 is a graph showing the normalized residual removal rates for a fully conductive pad before and after appropriate pad conditioning/break-in procedure. The Y-axis on the graph represents the normalized removal rate and the X-axis represents the wafer radius in millimeters with 0 mm representing the wafer center. The normalized removal rates for this example were performed with 300 mm wafers as discussed above. FIG. 5 compares 13 data points for a new fully conductive pad (represented by diamonds) and 13 data points after appropriate conditioning/break-in (represented by squares). The normalized removal rates for a new fully conductive pad range from approximately 0.08 to approximately 0.38. The normalized removal rates for a pad after appropriate conditioning range from approximately 0.68 to approximately 0.98.

Figure 6:
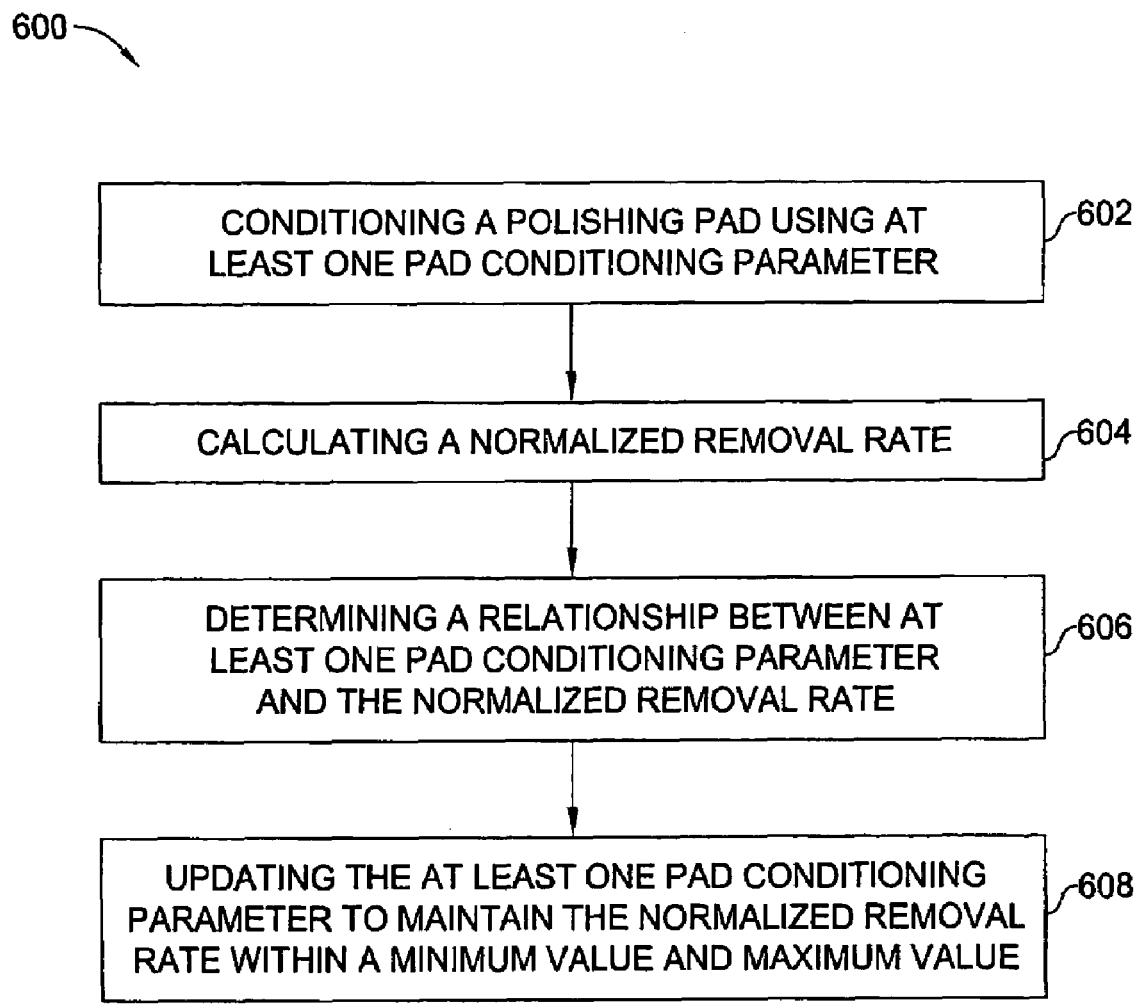
FIG. 6 is a flow diagram of one embodiment of a method for developing a pad conditioning procedure for an ECMP polishing pad.

FIG. 6 is a flow diagram of one embodiment of a method for developing a pad conditioning procedure for an ECMP polishing pad. The method 600 comprises conditioning a polishing pad using at least one pad conditioning parameter, calculating a normalized removal rate, determining a relationship between the at least one pad conditioning parameter and the normalized removal rate, and updating the at least one pad conditioning parameter to maintain the normalized removal rate within a minimum and maximum value.

The method 600 begins at step 602 by conditioning a polishing pad using at least one pad conditioning parameter. In one embodiment, the polishing pad is conditioned as discussed above. In some embodiments, the at least one pad conditioning parameter is selected from the group consisting of conditioning disk down force, conditioning disk rotational rate and direction, frequency and duration of conditioning, and conditioning disk translational speed and range.

At step 604, a normalized removal rate is calculated. As previously discussed, the normalized removal rate is the ratio of residue wafer removal rate to sheet wafer removal rate. The normalized removal rate indicates the quality of local electrical contact. The normalized removal rate is between 0 and 1. The higher the ratio, the better the local electrical contact. For the new pad without any conditioning/break-in on the pad, the normalized removal rate is only about 0.2. At this stage, the pad does not provide good local electrical contact therefore the residues will be very difficult to remove. After appropriate conditioning/break-in of the pad, the normalized removal rate increases to about 0.8. The pad at this stage provides good local electrical contact and is ready for use in the ECMP process.

At step 606, a relationship between the at least one pad conditioning parameter and the normalized removal rate is determined. In some embodiments of the invention, the relationship between the at least one pad conditioning parameter and the normalized removal rate is determined by incrementally varying the pad conditioning parameter and measuring the normalized removal rate.

At step 608, the at least one pad conditioning parameter is updated to maintain the normalized removal rate within a minimum and maximum value. In one embodiment the minimum value is about 0.6 and the maximum value is 1.0. In another embodiment, the minimum value is about 0.8 and the maximum value is 1.0. The pad conditioning parameters developed using this pad conditioning procedure can be used to condition other pads.

While the foregoing is directed to embodiments of the present invention, other and further embodiments of the invention may be devised without departing from the basic scope thereof, and the scope thereof is determined by the claims that follow.

The invention claimed is:

1. A method for evaluating an electrochemical mechanical polishing pad comprising:
   conditioning the polishing pad using a first set of process conditions;
   polishing a sheet wafer and a residue wafer on the polishing pad;

measuring removal rates of one or more materials from the sheet wafer and the residue wafer;

calculating a normalized removal rate; and further conditioning the polishing pad if the normalized removal rate is not between a minimum value and a maximum value.

2. The method of claim 1, wherein the minimum normalized removal rate value is about 0.6 and the maximum normalized removal rate value is about 1.0.

3. The method of claim 2, wherein the minimum normalized removal rate value is about 0.8 and the maximum normalized removal rate value is about 1.0.

4. The method of claim 1, wherein the normalized removal rate comprises a ratio of the removal rate of the residue wafer to the removal rate of the sheet wafer.

5. The method of claim 1, wherein measuring a removal rate comprises measuring the wafer thickness before and after polishing.

6. The method of claim 1, wherein the polishing pad comprises a fully conductive pad.

7. The method of claim 1, wherein the first set of process conditions comprises one or more process conditions selected from the group consisting of: the angular direction of the conditioning disk, the angular velocity of the conditioning disk, the frequency of conditioning, the time of conditioning, and the translational speed and range of the conditioning disk.

8. The method of claim 1 wherein the first set of process conditions is determined empirically.

9. The method of claim 1 wherein the first set of process conditions is determined historically.

10. A method of developing a pad conditioning procedure for a polishing pad used to remove one or more materials from a wafer, comprising:

conditioning the polishing pad using at least one pad conditioning parameter;

calculating a normalized removal rate by:

polishing a sheet wafer and a residue wafer using a first set of pad conditioning parameters;

measuring material removal rates of the sheet wafer and the residue wafer; and calculating a ratio of the removal rate of the residue wafer to the removal rate of the sheet wafer:

determining a relationship between at least one pad conditioning parameter and the normalized removal rate; and updating the at least one pad conditioning parameter to maintain the normalized removal rate within a minimum value and a maximum value.

11. The method of claim 10, wherein the minimum value of the normalized removal rate is about 0.6 and the maximum value of the normalized removal rate is about 1.0.

12. The method of claim 11, wherein the maximum and minimum values of the normalized removal rates are preferably between about 0.8 and about 1.0.

13. The method of claim 10, wherein the first set of pad conditioning parameters comprises one or more conditioning parameters selected from the group consisting of: the angular direction and angular velocity of a conditioning disk, the frequency of conditioning, the time of conditioning, and the translational speed and range of the conditioning disk.

14. The method of claim 10, further comprising further conditioning the polishing pad if the normalized removal rate is not between the minimum and maximum value.

15. The method of claim 10, wherein the polishing pad is a fully conductive pad.

16. The method of claim 10, wherein the relationship between at least one pad conditioning parameter and a normalized removal rate is determined empirically.

17. The method of claim 10, wherein the conditioning a polishing pad comprises contacting a conditioning element to the processing pad while processing the substrate.

18. The method of claim 10, wherein the relationship between the at least one conditioning parameter and the normalized removal rate is determined by incrementally varying the conditioning parameter and measuring the resultant normalized removal rate.

* * * * *